JOHN C. CLARK
POTATO DIGGER.

No. 75123

Patented MAR 3 1868

Witnesses:
William A. Cook
D. C. Tallmadge

Inventor:
John C. Clark

United States Patent Office.

JOHN C. CLARK, OF ELMIRA, NEW YORK.

Letters Patent No. 75,123, dated March 3, 1868.

IMPROVEMENT IN POTATO-DIGGERS.

*The Schedule referred to in these Letters Patent and making part of the same.*

TO ALL WHOM IT MAY CONCERN:

Be it known that I, JOHN C. CLARK, of Elmira, in the county of Chemung, and State of New York, have invented a new and useful Improved Potato-Digger; and I do hereby declare the following to be a clear and exact description of the nature thereof, sufficient to enable others skilled in the art to which my invention appertains to fully understand and use the same, reference being had to the accompanying drawings, making part of this specification, in which—

Figure 1:
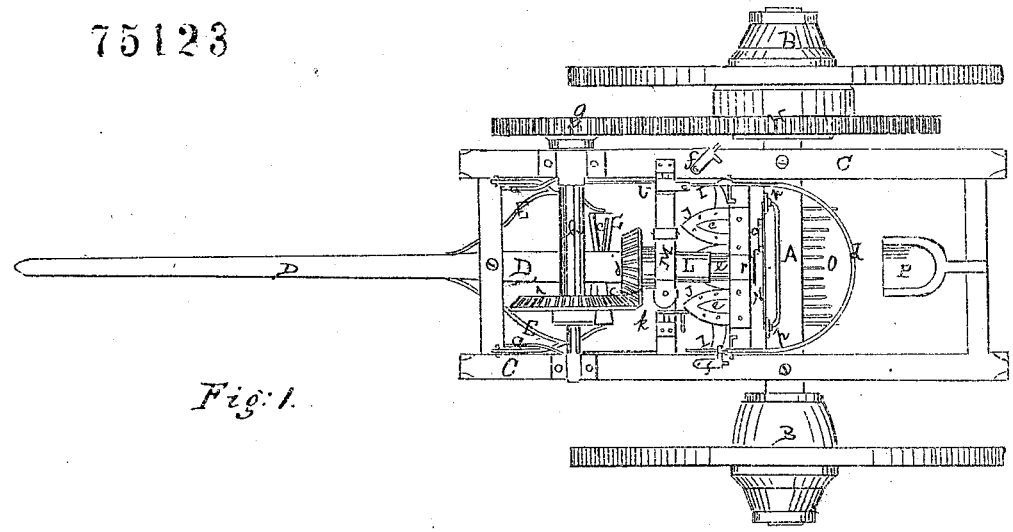
Figure 1 is a top view of the device illustrating my invention.
Figure 2:
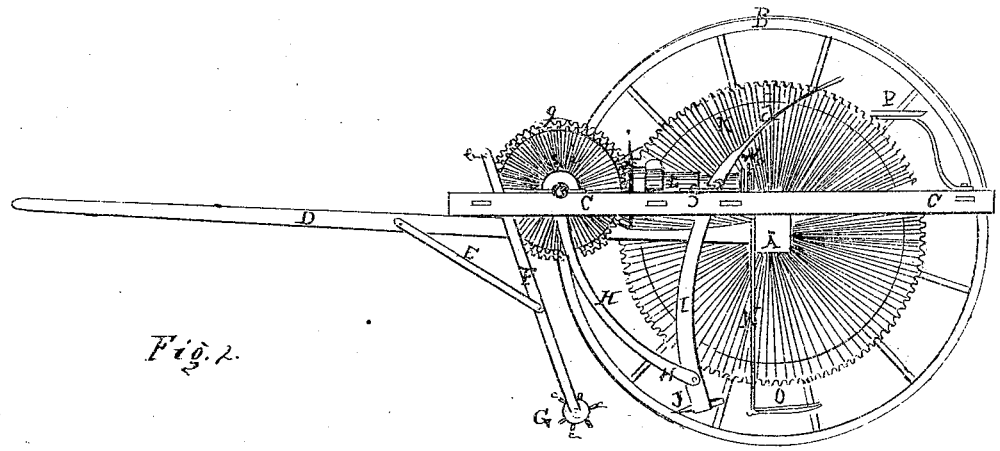
Figure 2 is a side view thereof.

My invention relates to certain improvements in potato-digger, and consists "in the cutter for the vines, also the peculiar hoes and the oscillating-rake or shaker, and the means for operating the various parts thereof, as will be hereinafter more fully described."

In the drawings, A represents the axle, mounted upon wheels B, and supporting the frame C. To the axle is secured the draught-pole or tongue D, which, with the other parts specified, is of ordinary form and construction.

To the pole D, I pivot braces E, which extend downwards, and are pivoted to vertical arms F, having a rising and falling motion between guides $a$, secured to the frame C. These arms have, at their upper end, stop-pins $b$, which limit the downward play of said arms, and prevent them from being moved toward the front of the pole or tongue.

G represents the vine-cutter, consisting of transverse knives $c$, secured to disks, which are journalled to the lower end of the vertical arms F. The cutting-edges of the knives are in concave form, or of the form of an arc of a circle, so that knives conform to the shape of the hills or rows in which the potatoes are planted.

To the forward ends of the longitudinal bars of the frame I pivot braces H, which extend downward, and have their lower ends pivoted to vertical arms I, which pass upwards, and are connected together to a bail or handle, $d$, so as to be readily operated. The lower ends of the vertical arms, I carry hoes J, which are secured thereto in any suitable manner. These hoes consist of blades having their forward ends of tapering or pointed forms, and are arranged transversely side by side. Each blade or hoe is provided, on its upper side, with a longitudinal ridge, $e$, which may extend partly or entirely the length of the blade or hoe, and may consist of a separate piece secured to the hoe, or of one piece struck up or stamped in proper shape.

A portion of the upper end of both arms I is cut away so as to form a notch, into which fits a catch, $f$, pivoted to frame C, where, when the catch is in the notch, the arms I will hold the hoes down to their work. The same catch is also adapted to enter an opening in the arms below the notch, so as to hold the hoes above the rows or hills when the device is not to be operated.

To one of the wheels B, or its hub, I secure, in any suitable manner, a toothed wheel, K, which receives its motion from said wheel, and gears with a smaller but similar wheel, $g$, secured to a shaft, $h$, having its bearings at the forward end of the frame C. The shaft $h$ also carries a bevel-wheel, $i$, which is secured to said shaft at a point between its bearing. This wheel $i$ gears with a similar wheel, $j$, secured to a shaft, L, whose bearings are on the middle cross-bars of the frame C. The forward bearing, M, of said shaft L, has a transverse motion, and is adapted to slide freely on its cross-bar. It is evident that the bevel-wheels $i$ $j$ may be easily put in and out of gear by means of the sliding bearing of the shaft L.

In order to keep the wheel $i$ away from the wheel $j$, I employ a hinged block, $k$, which is secured to the cross-piece of the frame, and is adapted to swing down and bear against the side of the bearing M, and thereby prevent its motion toward said block. A similar block, $l$, is secured to the frame at a point opposite to block $k$, and is intended to bear against the corresponding side of the bearing M, when the block $k$ is swung up, and the bearing M moved away from the block $l$. The block $l$ serves to keep the wheels $i$ $j$ in gear, and operates similar to block $k$.

The rear of shaft L carries an eccentric, $n$, provided with a wrist-pin, on which is pivoted one end of an arm, $o$, whose other end is pivoted near the side of the upper part of a frame, N, which is suspended between the wheels B. This frame N carries, at its lower side, the shaker or rake O, which consists of a series of teeth secured to said frame-end projecting longitudinally from the rear thereof, and arranged in the form of an arc, behind the hoes J, so as to receive the ground and potatoes from the hoes. The frame is provided, near its upper end, with friction-rollers or wheels $p$, which play on the axle, and serve to give a uniform motion to the shaker.

It is evident that if the wheels $i j$ are in gear, and the wheels B be moved forward, power will be communicated to the shaft L, through the medium of gearing $k\,g\,i\,j$, and thereby cause the shaker to oscillate. If, however, the wheels $i j$ be thrown out of gear, then no motion will be communicated to said shaker, and it therefore remains at rest.

When it is desired to use the device, the horses are started, the wheels $i j$ are thrown in gear, and the hoes J lowered to their full extent. The cutter G will be suspended by its own gravity, and its knives cut the vines. It will fully rise and fall relatively to the inequalities of the hills, but its weight will always cause it to bear against the vines while the knives straddle the hills or rows, owing to their conformity with the shape of the hills, and thereby surely cut the vines. The hoes enter the ground, and, by means of their ridges, $e$, cause it to be well raised and thoroughly broken, so as to deliver the dirt and potatoes to the shaker, whence the latter are soon cleaned of the former, and both separated.

When all the work is done, the cutter G and hoes J can be quickly raised, the shaker be made inoperative, and then all the parts are out of the way or in a state of rest.

P represents the driver's seat, supported by a suitable standard upon the rear of the frame C, so that the driver is within reach of the handle or bail of the hoes. The hinged blocks $k\ l$ and the sliding bearing M should have suitable levers, pins, or arms, to be readily reached by the driver's foot, and thereby throw the wheels $i j$ in and out of gear as desired.

The shafts for the gearing will have the necessary collars or shoulders, to prevent unintentional longitudinal and lateral play, and their bearings be properly secured or retained in place.

I desire to construct my device of suitable wood and metal, and do not limit myself to the especial or exact shape of the various parts, as described, further than they operate to accomplish the purposes intended.

Having thus described my invention, what I claim as new, and desire to secure by Letters Patent, is—

1. The cutter G, with arc-shaped knives $c$, substantially as described.
2. The cutter G, sliding arms F, and pivoted braces E, combined and operating substantially as described.
3. The hoes J, provided with ridges $e$, substantially as described.
4. The hoes J, sliding arms I, and pivoted braces H, combined and operating substantially as described.
5. The sliding bearing M, shaft L, and eccentric, $n$, or equivalent, in combination with the shaker O, substantially as and for the purposes described.
6. The combination of the arm $o$, eccentric, $n$, or equivalent, and reciprocating frame N, substantially as and for the purposes set forth.
7. The hinged blocks $k\ l$, in combination with the sliding bearing M, substantially as and for the purposes set forth.
8. The combination of the cutter G, hoes J, and shaker O, substantially as described.

To the above I have signed my name, this day, the 15th January, 1868.

JOHN C. CLARK.

Witnesses:
WILLIAM A. COOK,
L. C. TALLMADGE.